UNITED STATES PATENT OFFICE.

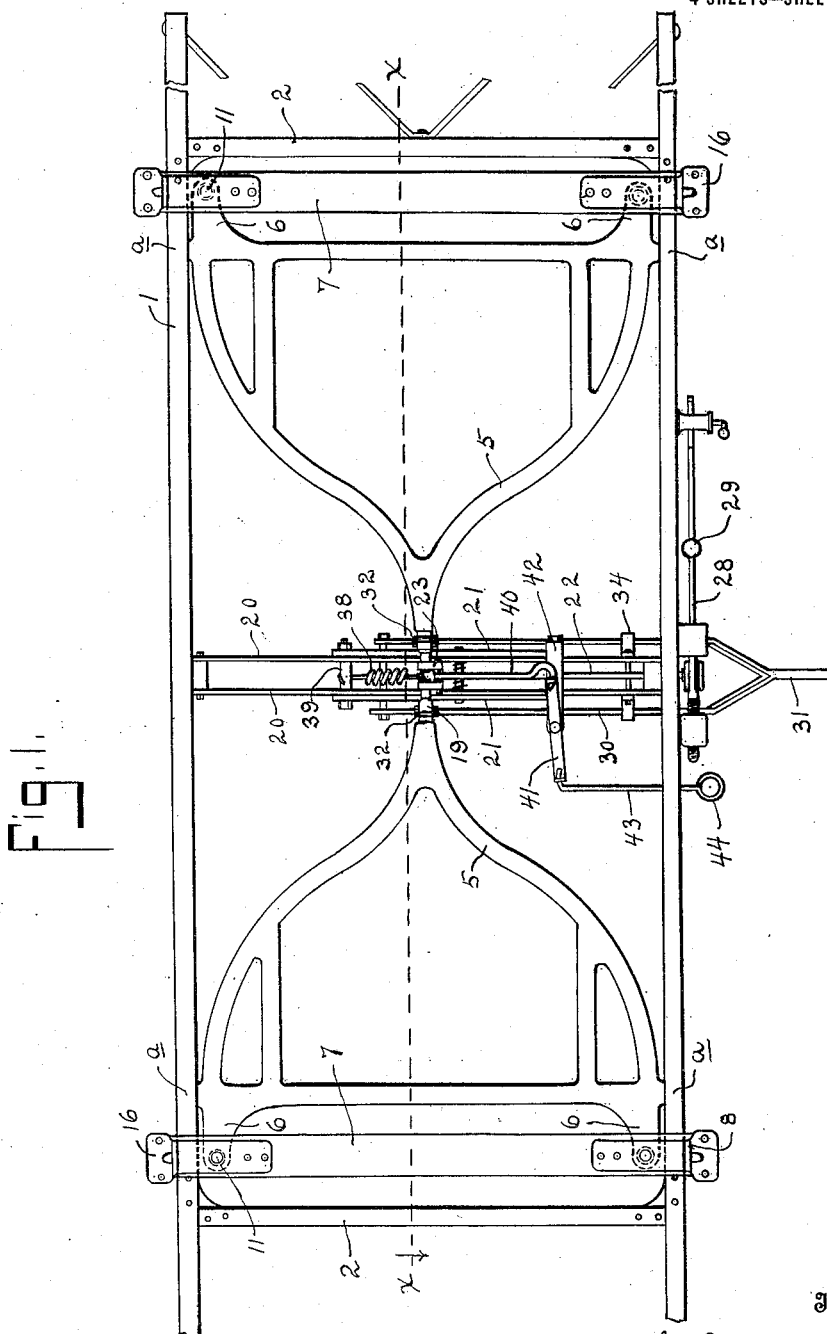

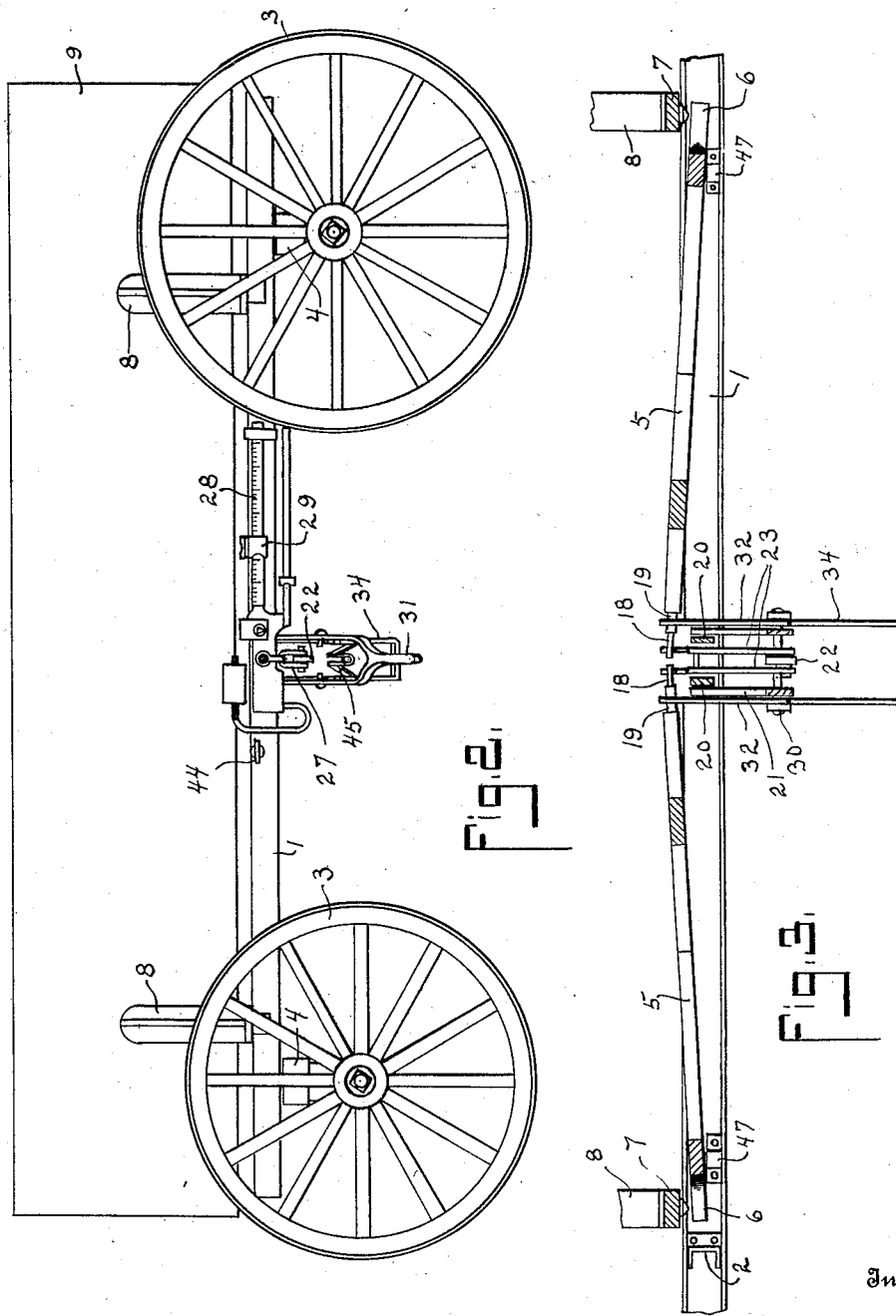

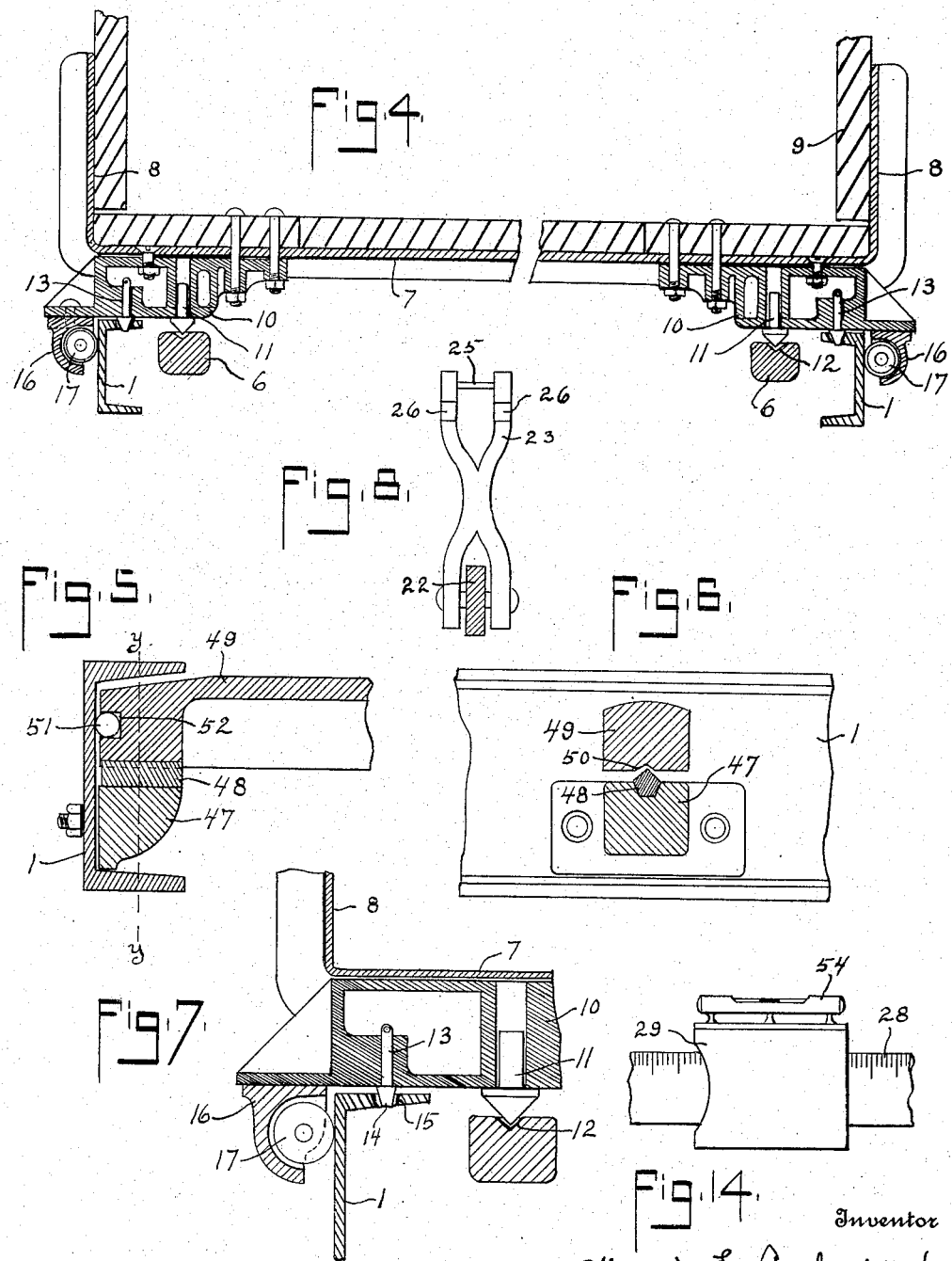

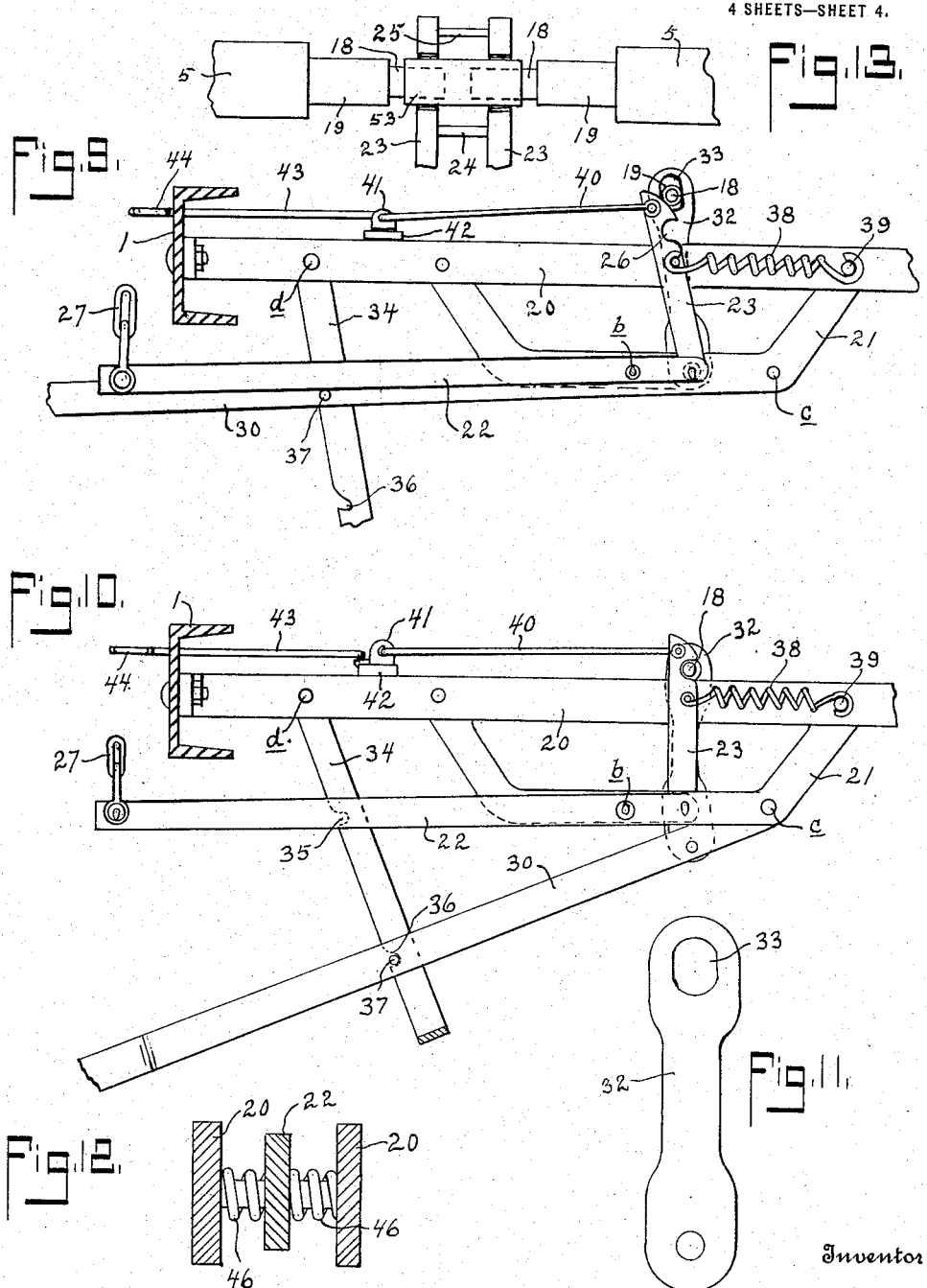

MARTIN E. ANDERSON, OF DE KALB, ILLINOIS, ASSIGNOR TO JACOB HAISH COMPANY, OF DE KALB, ILLINOIS.

WAGON-SCALE.

1,169,108.  Specification of Letters Patent.  Patented Jan. 25, 1916.

Application filed November 20, 1914. Serial No. 873,229.

*To all whom it may concern:*

Be it known that I, MARTIN E. ANDERSON, a citizen of the United States, residing at De Kalb, in the county of Dekalb and State of Illinois, have invented certain new and useful Improvements in Wagon-Scales, of which the following is a specification.

My invention has reference to wagon scales, of that class by use of which it is designed to weigh the contents of the wagon by means carried upon the wagon itself. In devices of this kind it is necessary, in order that they may operate in a satisfactory manner, that all of the operative parts by which the weight of the load is communicated to the scales must have perfect freedom of action, and shall not be interfered with by any contact between such parts through which friction will result. In the present machine the liability to such interference has been reduced to a minimum, so that the weight of the load will be perfectly and accurately indicated upon the weighing beam of the scale.

Other improvements in my invention consist in the provision of novel mechanism whereby the weight of the load may be normally carried on the frame of the wagon, and the more delicate scale parts be relieved from the strain thereof, except at such times when it is desired to ascertain the weight of the load, and especially when the wagon is in motion.

These and other novel features will more fully appear in the following specification, reference being had to the drawings accompanying the same, wherein;

Figure 1 is a plan view of my device, unmounted. Fig. 2 is a side elevation of a wagon equipped therewith. Fig. 3 is a longitudinal section in the line $x$—$x$ of Fig. 1. Fig. 4 is a longitudinal section medially of one of the bolsters 7. Fig. 5 is a longitudinal section of one of the bearings of one of the levers 5. Fig. 6 is a cross-section in the line $y$—$y$ of Fig. 5. Fig. 7 is an enlarged detail of one of the end-blocks 10 and appurtenant parts. Fig. 8 illustrates a modified form of the catches 23. Fig. 9 is a detail showing the parts for connecting the weighing frames with the scale mechanism, with such parts disconnected. Fig. 10 is a similar view with the parts connected. Fig. 11 is a detail of the link 32, detached. Fig. 12 is a cross-section through the bars 20 and lever 22 near the pivotal point thereof. Fig. 13 is a detail showing a slight modification of construction in my device. Fig. 14 shows a section of the scale-beam and sliding weight thereon.

Corresponding parts are indicated by similar numbers of reference throughout the several figures.

1 represents the main frame of the invention, preferably formed of channel-plates, and provided near its ends with cross-beams 2. The frame just described is designed to be supported by carrying-wheels 3, by means of the usual bolsters 4. Pivoted in the sides of the frame 1 as at $a$ in a manner hereinafter described, is a pair of frame-levers 5, provided with outwardly projected extensions 6, adapted to support the ends of cross-beams or bolsters 7, preferably formed of angle-plate. The ends of the bolsters 7 are bent upwardly into standards 8, between which may be supported the usual wagon-box 9. The ends of the beams 7 are provided with castings 10, fixed thereto in any suitable manner, and provided with pins 11, the lower pointed ends of which have a bearing in corresponding depressions 12 in the extensions 6. Each of the parts 10 is also provided with a pin 13, fixed therein, and provided with a frustum shaped end 14, which engages a corresponding opening 15 in the frame 1, and locks the beams 7 from movement independently of the frame when such beams are in lowered position. Each of the boxings 10 is also provided with a bracket 16 in which is mounted a roller 17, which has a bearing upon the outer face of the frame 1, and prevents endwise movement of the beam 7 while such beam is in elevated position, or is being raised or lowered.

At their inner ends the frames 5 are formed into pins 18, having enlarged portions 19. Uniting the sides of the frame 1 is a pair of bars 20, from each of which depends a bracket 21, (Figs. 9 and 10) and pivoted between said bars as at $b$ is a lever 22, the pivotal bearing being of the knife-edge type. At its inner end the lever 22 is pivotally connected with a pair of catches 23, united near their upper ends by pins 24 and 25, and provided with recesses 26, adapted to engage the ends 18 of the frames 5 when such ends are in a lowered position, as shown in Fig. 10. When in this position any movement of the frames 5 is imparted to the lever 22, to cause a contrary movement of the outer end thereof. The outer end of said lever 22 is connected by means of links 27 with the short end of a scale-beam 28, pivoted on the side of the frame 1, and provided with a sliding weight 29.

Pivoted to the brackets 21, as at $c$, is a hand-lever 30, preferably formed of two plates, and provided with a handle 31 projecting beyond the side of the frame 1. Each plate of said lever is connected with one of the enlarged portions 19 of the pins 18 by means of links 32, provided at their upper ends with openings 33 through which said pins pass. Said openings are of elongated form, so as to permit a limited movement of the fins independently of said links. Pivoted to the bars 20 as at $d$, is a frame 34, one edge of which is provided with notches 35 and 36, adapted to be engaged by pins 37 in the hand-lever 30. When said hand-lever is forced downwardly, into the position shown in Fig. 10, the ends 18 of the levers 5 are drawn downwardly into engagement with the recesses 26 of the catches 23, an inward movement of said catches being impelled by means of a coiled spring 38 secured at one end to the pin 24 and at the other end to a pin 39 uniting the bars 20. The seating of the ends of the levers 5 is automatic, the downward movement of the pins 18 against the curved upper edges of the catches 23 forcing such catches outwardly, until the pins reach the recesses 26 when the spring 38 compels an engagement therewith. In this operation the lever 30 is moved downwardly a little past the notch 36, but if left at this point the weight of the lever would be upon the pins 18 and interfere with the perfect action thereof. The lever 30 is therefore moved upwardly again until the pin 37 is in position in the notch 36, at which point the weight of the lever is entirely removed from the pins 18, such pins being centered in the openings 33, and are free to move up and down therein.

The upper ends of the catches 23 are connected by means of a rod 40 with a lever 41 fulcrumed on a cross-piece 42 fixed to the bars 20. (Fig. 1.) To the opposite end of the lever 41 is attached a rod 43, which passes outwardly through an opening in the frame 1 and is provided at its outer end with a handle 44. When the connecting devices are in the position shown in Fig. 10, and it is desired to release the same, so as to permit the load to rest upon the frame 1, the lever 30 is disconnected with the frame 34 and forced downwardly until the friction of the pins 18 in the catches 23 is relieved. The rod 43 is then forced inwardly, drawing the upper ends of the catches 23 outwardly, and permitting an upward movement of the pins 18, which is gradually accomplished by raising the lever 30 into a substantially horizontal position, as shown in Fig. 9. In the upward movement of the lever 30 the pins 37 slide past the notches 36 and find lodgment in the notches 35, which hold such lever in elevated position while the wagon is in movement, and at all times except when the load is being weighed. Said hand-lever 30 is provided with a guide 45, (Fig. 2.) secured between the plates of said lever, which guide embraces the lever 22 when the lever 30 is in raised position, and holds said lever 22 against side-play when the wagon is in motion. Such side movement and consequent rattling of the lever 22 is further prevented by means of springs 46 on the pivot of said lever, between the same and the bars 20. (Fig. 12.)

In order that the rocking movement of the frames 5 may be as free from friction as possible, bearings 47 are secured on the inner faces of the side-pieces 1 of the main frame, in which bearings are mounted knife-edge pieces 48, upon which the projections 49 of the frames 5 are supported, the lower faces of such projections being provided with angular recesses 50 to receive the edges of the bearing blocks 48. (Figs. 5 and 6.) Friction between the ends of the projections 49 and the face of the frame 1 is also precluded by means of a ball 51 in a recess 52 in the end of the projection.

It is obvious that when the inner ends of the frames 5 are drawn downwardly the outer ends 6 of such frames are raised, resulting in an elevation of the bolsters 7 until they are supported only by the frames 5, the weight of the load being imparted through the frames 5 and lever 22 to the scale, where the weight is indicated in the usual manner. As soon as the bolsters 7 begin to move upwardly the pins 13 are disengaged from the frame 1, the downwardly tapering form of the heads 14 and corresponding shape of the openings 15 causing a more speedy separation of the pins and frame.

In practical operation the ratio of length of the short ends 6 of the frames 5 to that of the rest of the frame is preferably about 1 on such short end to 10 of the inner end of the frame, and the same proportion is maintained in the lever 22, so that a weight of a hundred pounds on the outer ends of the frames 5 will be counterbalanced by one pound at the outer end of the lever 22. Approximately the same ratio is maintained in the hand-lever 30 as in the lever 22, so that the exertion of a downward force of one pound on the handle of the lever 30 is sufficient to raise a weight of one hundred pounds on the bolsters 8, or an average load of thirty-five hundred pounds can be readily controlled by the application of a force of thirty-five pounds on the hand-lever.

In Fig 8 is shown a form of the catches 23 in which said catches are united at a central point, and constitute practically one member, the lever 22 being pivoted between the lower bifurcations thereof, and the upper arms being provided with recesses 26 as in the former construction. In case the weight of the load is not equally distributed upon the frames 5 there may be a tendency of one of the pins 18 to move downwardly more slowly than the other, and this can be overcome by uniting the pins 18 loosely by means of a sleeve 53 as shown in Fig. 13. The sleeve is engaged by the recesses 26 in place of the ends of the frames 5, and a more uniform operation of such parts is thereby secured.

Fig. 14 shows a form of the sliding weight 29, wherein there is mounted upon such weight a level 54, which indicates whether or not the frame 1 is in a level position. In case it is not, the weight is moved along the scale beam until such beam assumes a level position, and in determining the final weight of the load the amount that is thus indicated by the scale in the first instance is deducted from the total weight of the load. It will be evident that by varying the nature of the support of the frame 1, the same may be used as a stationary scale, for the purpose of weighing animals or other movable property which may be placed thereon.

What I claim as my invention, and desire to secure by Letters Patent of the United States, is:

1. A device of the class described, comprising a suitably supported frame; a pair of frames fulcrumed therein with their inner ends in proximity to each other; a pair of bolsters normally supported on said main frame and capable of being elevated therefrom by the outer ends of said pivoted frames upon the inner ends thereof being forced downwardly; weighing devices carried on the side of the main frame; a transverse lever fulcrumed centrally of said main frame and connected at its outer end with said weighing devices; means for depressing the inner ends of said pivoted frames; and means for connecting the same with the inner end of said transverse lever.

2. A device of the class described, comprising a suitably supported main frame; a pair of frame levers fulcrumed therein, and having their inner ends in proximity to each other at a central point; a pair of bolsters normally supported on said main frame and adapted to be raised by the outer ends of said frame-levers upon the inner ends thereof being lowered; weighing mechanism carried on said main frame; a transverse lever fulcrumed centrally of said frame and connected with said weighing mechanism; connecting means attached to the inner end of said transverse lever adapted to engage the inner ends of said frames; and means for rocking said frames to cause such engagement.

3. In a device of the class described, a suitably supported main frame; a pair of lever frames fulcrumed therein, with their inner ends in proximity at a central point; a pair of bolsters normally supported on said main frame and capable of being raised above the same by the outer ends of said lever frames upon the inner ends thereof being lowered; weighing devices mounted on said main frame; a lever fulcrumed centrally of said main frame, and connected at its outer end with said weighing devices; means for connecting said lever with the inner ends of said lever frames upon the lowering thereof; and a hand-lever, fulcrumed centrally of said main frame and operatively connected with the inner ends of said lever frames to cause a downward movement thereof.

4. A device of the class described, comprising a main frame, suitably mounted; lever-frames fulcrumed therein; bolsters normally supported on said main frame, and capable of being elevated by the outer ends of said lever frames upon the same being suitably rocked; weighing devices carried on said main frame; a lever fulcrumed centrally of said main frame and connected with said weighing devices; means for connecting said lever with said lever frames upon the rocking thereof; a hand-lever fulcrumed in said main frame and operatively connected with said lever frames so as to suitably rock the same; and means for disconnecting said first-named lever and said lever-frames.

5. A device of the class described, comprising a main frame; lever frames rockingly mounted therein, and having their inner ends in proximity at a central point; load-supporting means normally supported on said main frame and capable of being elevated above the same by the outer ends of said lever frames upon the same being suitably rocked; a lever fulcrumed centrally of said main frame and operatively connected with said weighing devices; spring-controlled catches carried by said lever and capable of engaging the inner ends of said lever frames upon the same being lowered; a hand-lever fulcrumed in said frame and operatively connected with said lever frames to suitably rock the same; means for disconnecting said catches and lever frames; and means for holding said hand-lever in or out of operative position.

6. In a device of the class described, a main frame provided with suitable weighing devices; load-supporting means normally supported on said frame; lever frames rockingly mounted in said main frame, and adapted to elevate said load supporting devices upon being suitably operated; a lever fulcrumed centrally of said frame and operatively connected with said weighing devices; means for dis-connecting the same; a hand-lever fulcrumed in said main frame and operatively connected with said lever frames; means for holding said hand-lever in or out of operative position; and a guide, carried by said hand-lever, adapted to engage said first-named lever when the hand lever is out of operative position, and hold said lever from movement.

7. In a device of the class described a portable frame; weighing devices carried thereby; lever frames fulcrumed in said main frame and having their inner ends in proximity to each other at a central point; load-supporting mechanism normally supported on said main frame and adapted to be elevated above the same by said lever frames: a lever fulcrumed transversely of said frame and operatively connected with said weighing devices; means for detachably connecting said lever with the inner ends of said lever-frames upon the downward movement thereof; means for releasing said parts; and means for moving said lever-frames into a position to be engaged by said lever.

8. In a device of the class named, a suitably supported main frame; load-supporting mechanism normally supported thereon; lever-frames fulcrumed in said frame and capable of elevating said load-supporting mechanism above said frame; a scale-beam fixed to said frame and provided with a sliding weight; a leveling device mounted on said weight; a lever fulcrumed centrally of said frame and adapted to be detachably connected with the inner ends of said lever-frames; a hand-lever fulcrumed in said main frame and operatively connected with the inner ends of said lever-frames; and means for disconnecting said transverse lever from said lever-frames.

9. In a wagon scale, a suitably supported frame; weighing devices mounted thereon; frame-levers fulcrumed in said frame and provided at their outer ends with suitable bearing points; cross-beams normally supported on said main frame, and adapted to be engaged by the bearing points of said frame-levers, to cause the elevation of said cross-beams above said frame; means for suitably operating said frame-levers; and means for imparting the movement of said frame-levers to said weighing devices.

10. In a wagon scale, a suitably supported main frame; bolsters normally supported on said frame and provided at their ends with roller devices engaging the outer faces of the frame; frame-levers fulcrumed in said frame, and adapted to engage said bolsters at their outer ends, to elevate the same above said frame; weighing devices mounted on said frame; means for depressing the inner ends of said frame-levers; and means for imparting the movement of said frame-levers to said weighing devices when thus depressed.

11. In a wagon scale, a portable frame; bolsters normally supported thereon; frame-levers fulcrumed in said frame and having their inner ends in proximity to each other at a central point, the outer ends thereof being capable of engaging said bolsters to elevate the same upon the inner ends thereof being lowered; weighing devices mounted on said frame; means for imparting the movement of said frame-levers to said weighing devices; means for suitably actuating said frame-levers; and means for locking said bolsters in position on the main frame when in position thereon.

12. In a wagon scale, a portable frame; bolsters normally supported thereon; pins in said bolsters having downwardly tapering lower ends adapted to engage similar openings in said frame; frame-levers fulcrumed in said frame adapted to elevate said bolsters; weighing devices mounted on said frame; means for lowering the inner ends of said frame-levers to cause the elevation of said bolsters; and means for connecting said frame-levers with said weighing devices when in such lowered position.

In testimony whereof I affix my signature in presence of two witnesses.

MARTIN E. ANDERSON.

Witnesses:
R. H. STUNPLE,
E. H. BURR.